219-121

4/6/82

SR

XR 4,323,317

United States Patent [19]

Hasegawa

[11] 4,323,317

[45] Apr. 6, 1982

[54] PATTERN CONTROLLING DEVICE FOR LASER MARKER

[75] Inventor: Yasuyuki Hasegawa, Kanazawa, Japan

[73] Assignee: Shibuya Kogyo Company, Ltd., Ishikawa, Japan

[21] Appl. No.: 147,683

[22] Filed: May 7, 1980

[51] Int. Cl.³ .......................... B41J 3/02; B23K 9/00

[52] U.S. Cl. ................................ 400/118; 346/76 L; 219/121 LR; 219/121 LP

[58] Field of Search ............... 400/103, 119, 118, 120; 358/202, 204; 401/112, 129, 1 R; 346/76 L; 219/121 L, 121, LA, 121 LB, 121 LP, 121 LR, 121 LM, 121 LU, 121 LX, 121 LL, 121 LQ; 430/303, 945; 350/359-361, 322, 319

[56] References Cited

U.S. PATENT DOCUMENTS

| | | | |
|---|---|---|---|
| 2,746,193 | 5/1956 | Billian | 219/121 LP X |
| 3,518,925 | 7/1970 | Chitayat | 219/121 LP X |
| 3,549,733 | 12/1970 | Caddell | 219/121 LP X |
| 3,570,380 | 3/1971 | Kamenstein | 346/76 L |
| 3,656,175 | 4/1972 | Carlson et al. | 346/76 L |
| 3,947,093 | 3/1976 | Goshima et al. | 350/206 X |
| 4,032,861 | 6/1977 | Rothrock | 219/121 LP X |
| 4,118,128 | 10/1978 | van den Essen | 400/118 |
| 4,118,619 | 10/1978 | McArthur et al. | 219/121 LQ |
| 4,194,814 | 3/1980 | Fischer et al. | 346/76 L |
| 4,200,875 | 4/1980 | Galanos | 346/76 L X |

FOREIGN PATENT DOCUMENTS

| | | | |
|---|---|---|---|
| 2529107 | 1/1976 | Fed. Rep. of Germany | 400/118 |

*Primary Examiner*—E. H. Eickholt
*Attorney, Agent, or Firm*—Blanchard, Flynn, Thiel, Boutell & Tanis

[57] ABSTRACT

A plurality of rotatable members are formed with patterns of given shapes which permit the passage of a laser beam, and which are arranged in concentric circles about the axis of rotation of the members. Part of each rotatable member is disposed in the path of the laser beam so that a combination of the individual patterns on the respective rotatable members define a pattern to be printed or marked. In this manner, a variety of printing or marking patterns can be easily obtained by merely controlling the angular position of the respective rotatable members.

12 Claims, 6 Drawing Figures

PATTERN CONTROLLING DEVICE FOR LASER MARKER

BACKGROUND OF THE INVENTION

The invention relates to a laser marker in which a laser beam is channeled or profiled into a printing pattern which is to be marked on the surface of an object, and more particularly, to a pattern controlling device for use in such laser marker.

Generally, a printing pattern in a laser marker of the kind described is obtained by the use of a mask which is provided with areas having a transmittance of zero and areas having a transmittance of unity which define a given pattern. When the mask is placed into the path of passage of the laser beam, the laser beam is channeled into the given pattern and then collected by a condenser lens to irradiate a label applied to the outer surface of a container, for example, thus marking the pattern on the label. In the conventional laser marker, the mask used is usually punched from a thin metal sheet, and is fixedly located in the path of passage of the laser beam. When it is desired to change the pattern to be marked on the label, the mask must be replaced by another which is again punched into a desired configuration. As a consequence, the replacement of the masks and the maintenance of a variety of masks require both time and labor. It is virtually impossible to mark a lot number corresponding to each container or each group of containers on the labels of containers which are being continuously conveyed at a high speed by a conveyor unit because it is difficult to achieve a reliable replacement of the masks.

SUMMARY OF THE INVENTION

Therefore, it is an object of the invention to provide a technique which permits a variety of printing patterns to be easily obtained. This object is achieved by providing a plurality of rotatable discs disposed in coaxial relationship and in which given patterns are formed which permit the passage of the laser beam therethrough. The respective rotatable discs are partly disposed in a path of passage of the laser beam so that the patterns on the individual rotatable discs are combined to define one of the printing patterns.

It is another object of the invention to facilitate the formation of printing patterns by controlling the relative positions of the individual rotatable discs by setting the angular position of a single one of the rotatable discs.

It is a further object of the invention to enable an automatic formation of a particular printing pattern by employing a drive mechanism which includes a motor in order to control the position of and the drive to the individual rotatable discs.

It is yet another object of the invention to achieve the setting of the relative position of the individual rotatable discs with a high accuracy.

Other objects and advantages of the invention will become apparent from the following description with reference to the drawings.

DESCRIPTION OF EMBODIMENT

Figures 1, 2:
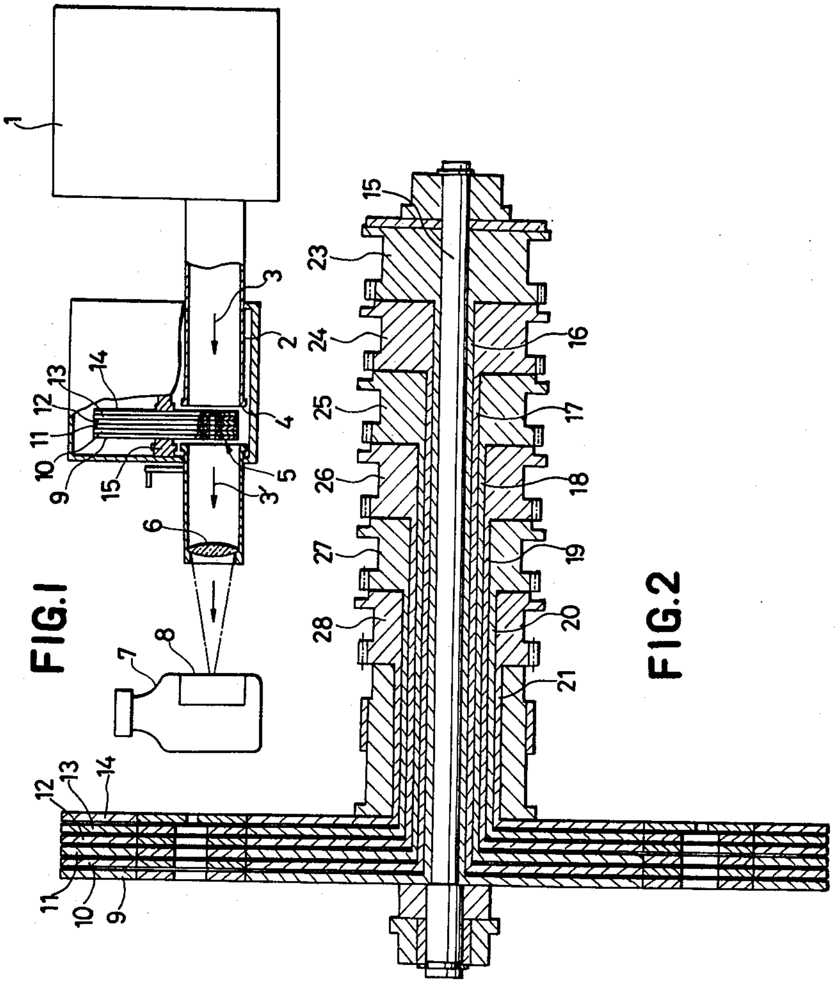
FIG. 1 is a schematic side elevation, partly in section, of a laser marker incorporating the invention.
FIG. 2 is an enlarged side elevation, partly in section, of part of the arrangement shown in FIG. 1.

Referring to FIG. 1, an embodiment of the invention is generally shown in FIG. 1 where a laser oscillator 1 produces a laser beam 3 which is led into a conduit 2. The conduit 2 is formed with a slit 4 in which a mask 5 is disposed for selectively passing the laser beam. It should be noted that the laser beam 3 comprises a collimated beam. The mask 5 comprises areas having a transmittance of zero and areas having a transmittance of unity for the laser beam, and these areas are formed in given patterns. Hence, after passing through the mask 5, the laser beam 3' is channeled to a profile which conforms to that of areas having a transmittance of unity. The laser beam 3' is then collected by a condenser lens 6 to irradiate an object, for example, a label 8 applied to the external surface of a container 7, thus marking the pattern thereon.

In the present embodiment, the pattern controlling device of the invention is adapted to mark six digits on the label 8. At this end, the mask 5 comprises six rotatable discs 9, 10, 11, 12, 13 and 14 which are closely spaced from and aligned with each other while permitting their independent rotation about a common axis 15. Openings are formed in these discs representing numerals from 0 to 9 at given positions as by punching. To permit such rotation, each disc 9 to 14 has a hollow cylinder 16, 17, 18, 19, 20 or 21 fixedly mounted centrally on one side thereof, as indicated in FIG. 2. The cylinder 16 attached to the foremost rotatable disc 9 is rotatably fitted on the shaft 15 and has the greatest axial length among the cylinders. The free end of the cylinder 16 fixedly carries a counter gear 23 which forms part of a counter mechanism 22 to be described later. The next foremost rotatable disc 10 has a hollow cylinder 17 attached thereto, which is telescoped or rotatably fitted over the first mentioned cylinder 16. The cylinder 17 has an axial length which is less than that of the cylinder 16 by an amount corresponding to the axial length of the counter gear 23. The free end of the cylinder 17 fixedly carries a counter gear 24 similar to the counter gear 23. In the similar manner, the remaining cylinders 18, 19, 20, 21 are attached to the central region of the respective rotatable discs 11, 12, 13, 14, respectively, and has axial lengths which decrease sequentially as their associated rotatable discs 11 to 14 are successively located rearward. Their free end fixedly carries counter gears 25, 26, 27, 28, respectively. Consequently, when the counter gears 23 to 28 are independently driven for rotation by a counter mechanism to be described later, the discs 9 to 14 can be independently rotated.

Figure 3:
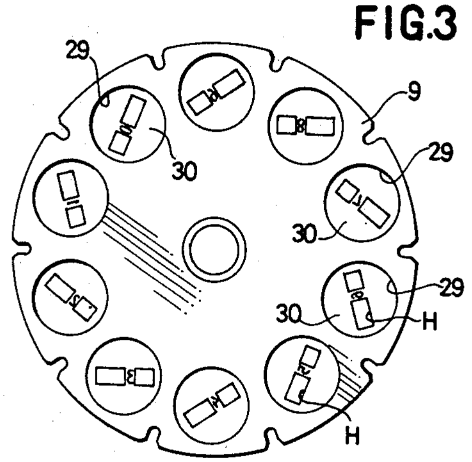
FIG. 3 is a plan view showing one example of a rotatable disc.
Figure 4:
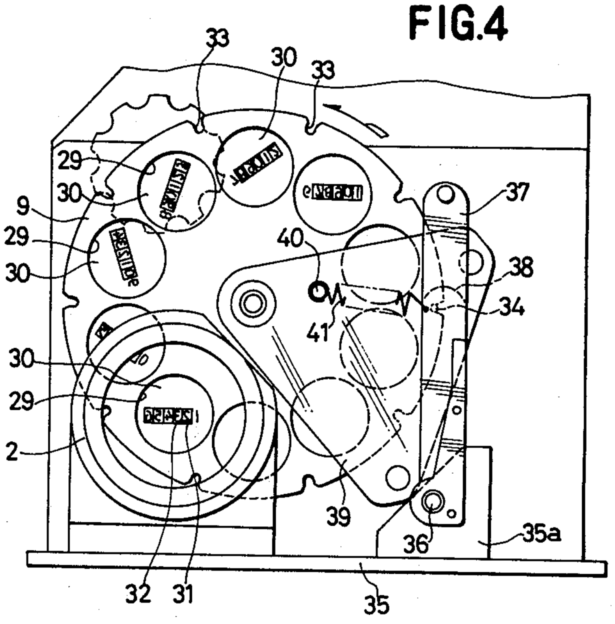
FIG. 4 is a front view showing the essential part of a laser marker incorporating the invention.

The six rotatable discs 9 to 14 are formed by thin circular metal sheet. They have substantially the same diameter, and each of the rotatable discs 9 to 14 is formed with ten circular openings 29 formed along its full periphery at an equal interval, the openings having a diameter on the order of about one-fifth the disc diameter. The arrangement for one of the rotatable discs, 11, is illustrated in FIG. 3. Patterned discs 30 having one of numerals from 0 to 9 punched therein are attached to the circular openings 29. Referring to FIG. 3, the punched numerals are arranged on the disc 9 in the sequence of 0, 1, 2 . . . 9 as viewed counter-clockwise. Referring to FIG. 4, it will be noted that when respective ones of the patterned discs 30 are positioned in alignment with the axis of the conduit 2, there is formed a printing pattern having a transmittance of unity for the laser beam which comprises a six digit figure, one digit from each of the discs. At this end, the punched numerals 0 to 9 are formed on concentric circles on the individual rotatable discs 9 to 14, and each punched numeral is associated with rectangular slots H which are aligned with the numerals of other discs.

In FIG. 4, a printing pattern comprising a six digit figure "1 2 3 4 5 6" is defined in the conduit 2. Specifically, the numeral "1" from the ten patterned discs of the foremost rotatable disc 9 which carry the punched numerals 0 to 9 is located within the conduit 2 as the most significant digit of the six digit figure. A rectangular slot 31 is formed in lateral alignment with the numeral "1" to permit the passage therethrough of the laser beam which has passed through the punched figures in the rotatable discs 10 to 14 which are located rearwardly of the rotatable disc 9. Thus, the next disc 10 is angularly positioned so that a patterned disc having the punched figure "2" is located within the conduit 2. It is to be noted that a rectangular slot 32 which permits the passage of the laser beam which has passed through the punched numerals on the rotatable discs 11–14 which are located rearwardly of the disc 10 as well as a rectangular slot which permits the passage of the laser beam therethrough to be transmitted through the punched numeral "1" on the rotatable disc 9 are formed in lateral alignment with the punched numeral "2". In the similar manner, the patterned discs on the rotatable disc 11–14 which are located within the conduit 2 present numerals "3", "4", "5", "6" and rectangular slots which permits the laser beam transmitting through the punched figures in the other discs to pass therethrough. It is to be understood that all other patterned discs which are not located within the conduit 2 are similarly formed with its own punched numeral and rectangular slots which permit the laser beam transmitting through the punched figures of other patterned discs to pass through the particular patterned disc.

Figure 5:
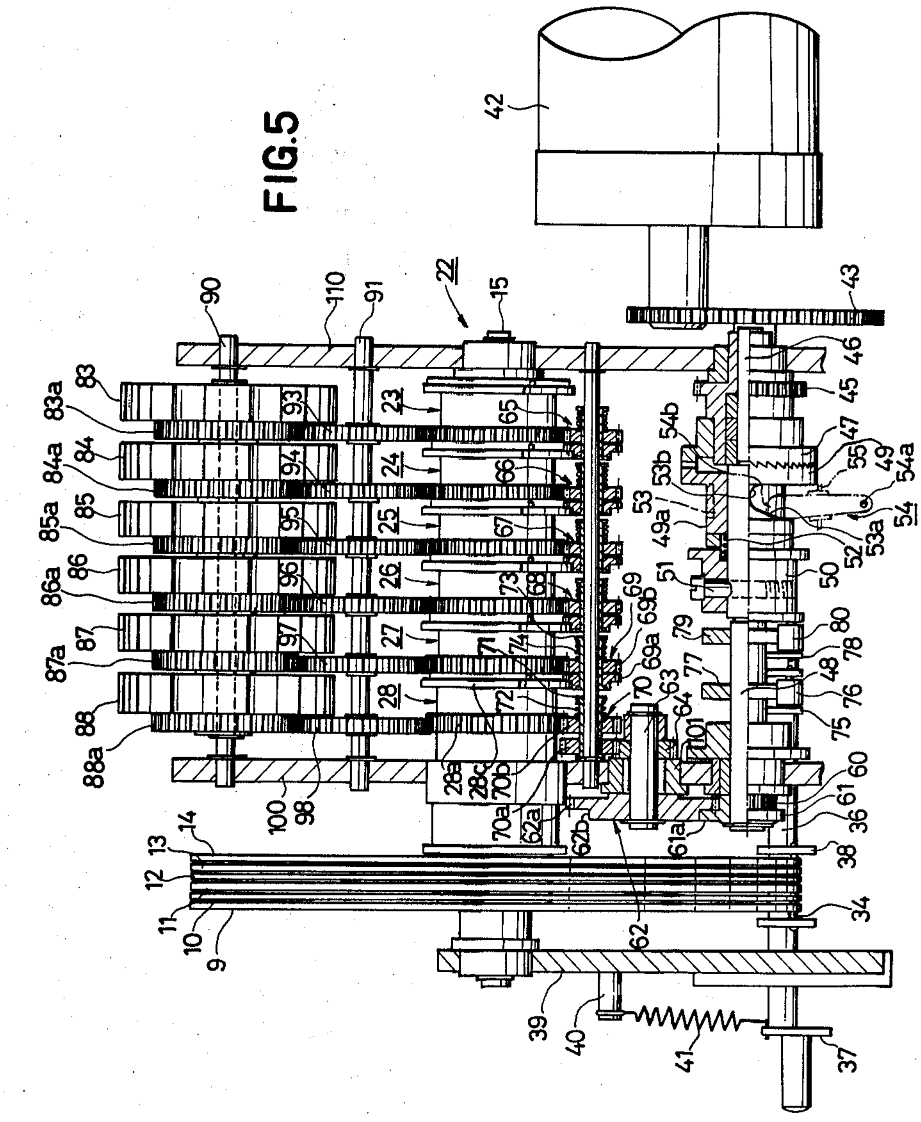
FIG. 5 is a side elevation, partly in section, of the laser marker.
Figure 6:
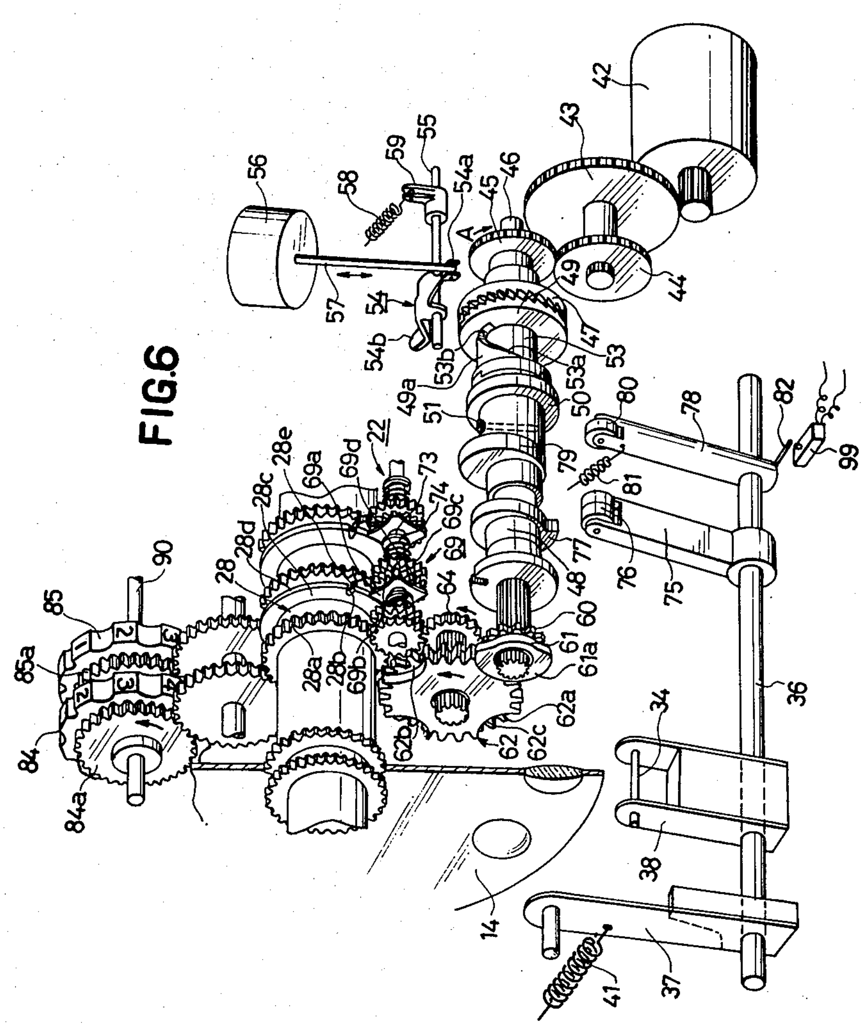
FIG. 6 is a perspective view of essential components used in the arrangement of the invention.

To change the printing pattern defined within the conduit 2, the rotatable discs 9 to 14 may be controllably rotated. Referring to FIGS. 5 and 6, there is shown the counter mechanism 22 which controls the rotation of these discs in response to a drive from a drive motor 42. The drive motor 42 is connected through intermediate gears 43, 44, 45 to rotate a clutch shaft 46 which is journaled in a stationary plate 110. A cam shaft 48 is journaled in a stationary plate 100 in coaxial relationship with the clutch shaft 46, and the end of the clutch shaft 46 located adjacent to the cam shaft 48 fixedly carries a clutch plate 47 while the end of the cam shaft 48 adjacent to the clutch shaft 46 carries a clutch plate 49 which is only capable of sliding in the axial direction and which is disposed in opposing relationship with the clutch plate 47. The pair of clutch plates 47, 49 can be brought into meshing engagement with each other to cause an integral rotation of the clutch shaft 46 and the cam shaft 48. The drive motor 42 rotates continuously, thus driving the clutch plate 47 for rotation. Hence, when it is desired to operate the rotatable discs 9 to 14 by driving the counter mechanism 22, the pair of clutch plates 47, 49 may be coupled together to cause a rotation of the cam shaft 48. Conversely, the clutch plates 47, 49 may be disengaged from each other to stop the counter mechanism 22.

A wheel 50 located adjacent to the clutch plate 49 is integrally connected to the cam shaft 48 by means of a pin 51. A spring 52 is disposed between the wheel 50 and the clutch plate 49 to urge the latter toward the other clutch plate 47 to achieve a coupling therebetween. The clutch plate 49 has a portion 49*a* of a reduced diameter, the peripheral surface of which is formed with a groove cam 53 which extends in the circumferential direction thereof. As shown in FIG. 6, the width of the groove cam 53 gradually reduces over about one-fourth the perimeter. A stop 54 having the same width as the reduced width of the groove cam 53 is disposed above the groove cam 53 and is rockable in the vertical plane. The stop 54 have an engaging piece 54*b* which has its side located in engagement with the sidewall of the groove cam 53 nearer the wheel 50 in its region of the increased width when the pair of clutch plates 47, 49 are coupled together. The stop 54 is fixedly mounted on a rod 55 which is rotatably supported in a stationary part of the apparatus on which a solenoid 56 is fixedly mounted carrying a pin 57 which depends downwardly therefrom and on which the rockable end 54*a* is mounted. When the solenoid 56 is not energized, the pin 57 assumes its upper position to cause the engaging piece 54*b* of the stop 54 in engagement with the groove cam 53 in the region of its reduced width, urging the clutch plate 49 to the left against the resilience of the spring 52, thus releasing it from the clutch plate 47. On the other hand, when a signal which requires a change in the printing pattern located within the conduit 52 is fed from an operating unit, not shown, or when a command is produced which demands a rotation of the rotatable discs 9 to 14, the solenoid 56 is energized for a given time interval, thus driving the pin 57 for one vertically reciprocating motion. Thus, as the pin 57 moves down, the engaging piece 54 is driven upward to be disengaged from the groove cam 53, whereby the clutch plate 49 is urged by the spring 52 to be coupled with the clutch plate 47, thus transmitting the rotation of the drive motor 42 to the cam shaft 48. The solenoid 56 is deenergized before the cam shaft 48 completes one revolution, and the pin 57 is driven upward, causing the engaging piece 54*b* to begin moving down. Since the clutch plate 49 is still urged by the spring 52 to be located against the clutch plate 47, the engaging piece 54*b* of the stop 54 initially engages the sidewall of the wheel 50 in the region of the groove cam 53 having an increased width. As the cam shaft 48 rotates, the bevelled surface 53*a* of the groove cam 53 comes into engagement with the engaging piece 54*b*, whereby the clutch plate 49 is driven to the left against the resilience of the spring 52, whereby it is released from the clutch plate 47. Consequently, the cam shaft 48 is disconnected from the drive motor 42 and the end 53*b* of the groove cam 53 bears against the engaging piece 54*b* to cease the rotation of the cam shaft 48. It is to be noted that a fixture 59 is fixedly mounted on the rod 55, and a spring 58 extends between the fixture and a stationary part of the apparatus to urge the pin 57 upward normally, thus assisting in the engagement of the engaging pice 54*b* of the stop 54 with the groove cam 53.

The cam shaft 48 extends through the stationary plate 100, and fixedly carries a gear 60 on the opposite side thereof. The gear 60 is provided with a hiatus which extends over a circumferential length corresponding to six consecutive teeth when the gear has fourteen teeth. A cam 61 is mounted on the cam shaft 48 for integral rotation with the gear 60. The cam 61 is formed with an arcuate cam profile 61*a* in its region which corresponds to the hiatus of the gear 60. An intermediate gear 62 having an increased diameter is fixedly mounted on an intermediate shaft 63 which is journaled in the stationary plate 100 by means of a bearing 101, and includes thirty-two teeth 62*a* which are capable of meshing with the teeth 60, and recesses 62*b* having an arcuate portion 62*c* which conforms to the arcuate cam profile 61*a*. It is to be noted that four recesses 62*b* are formed around the periphery of the gear 62 at an equal interval. Consequently, when the cam shaft 68 rotates through one revolution, the gear 60 meshes with the intermediate gear 62 for 8/14 revolution of the cam shaft 48, causing the intermediate gear 62 to rotate through ¼ revolution. The arcuate cam profile 61*a* engages the arcuate recess 62*b* formed in the intermediate gear 62 for an interval corresponding to a rotation of the cam shaft 48 through 6/14 revolution. At this time, the cam 61*a* only slidably rotates within the recess 62*b* without transmitting the rotation of the cam shaft 48. Hence, the intermediate gear 62 is prevented from rotating by the engagement between the arcuate cam 61*a* and the recess 62*b*. A gear 64 of a reduced diameter and having twelve teeth is fixedly mounted on the intermediate shaft 63, and meshes with a counter gear 70 of the counter mechanism 22 to be described later.

The counter mechanism 22 is essentially a conventional arrangement, and includes the counter gears 23 to 28 mentioned above, and counter pinions 65 to 70 which are rotatably mounted on a shaft 102, journaled in the stationary plates 100 and 110, and meshing with the counter gears 23 to 28, respectively. The counter pinion 70 includes a sleeve 71 which is rotatably mounted on the shaft 102, a pair of gears 70*a*, 70*b* mounted on the sleeve 71 and each having twelve teeth, and a spring 72 disposed between the flange of the sleeve 71*a* and the gear 70*b*. The spring 72 urges the both gears 70*a*, 70*b* together so that they are integrally connected with each other by friction. The gear 70*a* meshes with the gear 64 of a reduced diameter while the gear 70*b* meshes with a gear 28*a* integral with the counter gear 28 and having thirty teeth. Hence, when the gear 64 of a reduced diameter and having twelve teeth rotates through ¼ revolution, its meshing gear 70*a* (twelve teeth) and its integral gear 70*b* (twelve teeth) also rotates through ¼ revolution, whereby the gear 28*a* (thirty teeth) rotates through 1/10 revolution. In other words, the rotatable disc 14 which carries the least significant digit of the six digit figure is rotated through 1/10 revolution, changing the least significant digit by one.

A cam disc 28*c* having a notch 28*b* is formed on the counter gear 28, and the notch 28*b* engages a projecting cam 69*a* on a counter pinion 69 which is disposed adjacent to the counter pinion 70. The counter pinion 69 includes a sleeve 73 which is rotatably mounted on the shaft 102, a gear 69*b* fitted over the sleeve 73 and having four projecting cams 69*a*, a gear 69*c* having twelve teeth, and a spring 74 disposed between the flange of the sleeve 73 and the gear 69*c* to urge the both gears 69*b*, 69*c* into an integral assembly. Arcuate depressions 69*d* formed between the four projecting cams 69*a* have a curved surface which is substantially identical to that of the arcuate periphery 28*d* of the cam disc 28*c*. The cam disc 28*c* normally rotates while engaging its arcuate periphery 28*d* with the arcuate portion 69*d*. Since the gear 69*b* is prevented from rotating by the engagement between the arcuate portion 69*d* and the arcuate periphery 28*d*, it remains stationary. However, as the cam disc 28*c* rotates to bring the notch 28*b* close to the projecting cam 69*a*, a pawl 28*e* located adjacent to the notch 28*b* engages the gear 69*b*, causing the latter to rotate. In this manner, the notch 28*b* is locked to the projecting cam 69*a*. As the cam disc 28*c* further rotates, the notch 28*b* acts through the projecting cam 69*a* to cause the gears 69*b*, 69*c* to rotate, whereby the arcuate periphery 28*d* of the cam disc 28*c* engages the adjacent arcuate portion 69*d*, bringing the both gears 69*b*, 69*c* to a stop again. As a consequence, the gear 69*b* has rotated through ¼ revolution, and hence the gear 27*a* (thirty teeth) on the counter gear 27 has rotated through 1/10 revolution. It will thus be seen that as the rotatable disc 14 carrying the least significant digit rotates through one revolution, the rotatable disc 13 carrying the next least significant digit rotates through 1/10 revolution, enabling a carry to be propagated. A carry propagation between other digits takes place in the same manner. It will be seen that the principle of the operation is quite similar to that of a conventional counter mechanism.

A plurality of index wheels 83 to 88 are provided in order to permit an operator to read the figure of the printing pattern defined within the conduit 2, and carry numerals from 0 to 9 on their periphery. These index wheels 83 to 88 are integrally provided with gears 83*a* to 88*a* each having thirty teeth. Index wheels are mounted on a shaft 90 which is rotatably mounted in the stationary plates 100, 110. A plurality of gears 93 to 98 each having thirty teeth are fixedly mounted on a shaft 91 which is journaled in the stationary plates 100, 110, at a location intermediate the index wheels 83 to 88 and the counter mechanism 22, in order to drive the index wheels 83 to 88 in accordance with the movement of the counter gears 23 to 28. Stated differently, each of the index wheels 83 to 88 is adapted to rotate through the same angle as the angle of rotation of a corresponding one of the counter gears 23 to 28. Hence, if a six digit figure appearing within the conduit 2 changes, the figure indicated by the index wheels 83 to 88 changes in a corresponding manner.

Ten notches 33 are formed in the periphery of each rotatable disc 9 to 14 at an equal interval, and is adapted to be engaged by a stop pin 34, thus achieving an aligned stop position of the respective rotatable discs 9 to 14. The apparatus includes a casing 35 in which a stop shaft 36 is rotatably mounted by means of fixtures 35*a*. An operating lever 37 and a stop lever 38 are fixedly mounted on the stop shaft, and the stop pin 34 is fixedly mounted on the free end of the stop lever 38 so as to extend parallel to the axis of the rotatable discs 9 to 14. A spring 41 is disposed across the operating lever 37 and a pin 40 on a triangular plate 39 which is secured to the casing 35, thus normally urging the operating lever 37 toward the rotatable discs. As a result, the stop shaft 36 is normally urged by the spring 41 to rotate counterclockwise, as viewed in FIG. 3, with result that the stop pin 34 engages one of the ten notches 33 formed in the periphery of the rotatable discs 9 to 14, thus preventing a further rotation of these discs. At this time, the printing pattern comprising a six digit figure is centrally defined in the conduit 2, with adjacent digits being correctly aligned with each other. To change the printing pattern, that is, to rotate the discs 9 to 14, the stop shaft 36 must be rotated against the resilience of the spring 41 to thereby disengage the stop pin 34 from the notches 33 before selected rotatable discs can be rotated.

When the rotatable discs 9 to 14 are locked, the stop pin 34 is engaged with the notches 33 formed in these discs. When the rotatable discs 9 to 14 are to be rotated, the stop pin 34 is released from the notches 33 in the following manner: Specifically, a cam roller 76 pivotally mounted on the free end of a cam lever 75 which is secured to the stop shaft 36 is brought into abutment against a cam 77 mounted on the cam shaft 48 to cause a rocking motion of the cam lever 75 through the cam 77 as the cam shaft 48 rotates, thereby rotating the stop shaft 36 to disengage the stop pin 34 from the notches 33.

Rotatably mounted on the stop shaft 36 is one end of a shot lever 78 which is used to issuee a laser beam shot initiation command. The other end of the shot lever 78 pivotally carries a cam roller 80 which is disposed for abutment against a cam 79 mounted on the cam shaft 48, and the cam roller 80 is normally urged into abutment against the cam 79 by means of a spring 81 disposed between the lever 78 and a stationary part of the apparatus. The end of the shot lever 78 which is located nearer the stop shaft 36 fixedly carries an arm 82, the free end of which is adapted to move toward or away from a limit switch 99 in response to a rocking motion of the lever 78. The arm 82 bears against the limit switch 99 to turn it ON as the shot lever 78 is driven by the cam 79 to its lower position, as viewed in FIG. 4, thereby transmitting a signal to an operating unit, not shown, which prevents the emission of the laser beam into the conduit 2. On the contrary, when the shot lever 78 rocks toward the cam shaft 48, the arm 82 moves away from the limit switch 99 to turn it OFF, thereby enabling the emission of the laser beam. Obviously, the cam 79 is configured such that the arm 82 is disengaged from the limit switch 99 after the stop pin 34 has engaged with the notches 33 in the rotatable discs 9 to 14.

As a result of the described arrangement, a printing pattern may be changed as follows: Initially, an operating unit, not shown, issues a rotation command to the solenoid 56, which causes the pin 57 to move down, thereby rocking the engaging piece **54*b* of the stop 54 upward. As a consequence, the engaging piece 54*b* is disengaged from the groove cam 53 formed in the clutch plate 49, which is then coupled with the normally rotating clutch plate 47 connected to the drive motor 42, thus beginning to rotate. Consequently, the cam shaft 48 rotates to initiate a rocking motion of the cam lever 75 and the shot lever 78, disengaging the stop pin 34 from the notches 33 in the rotatable discs 9 to 14. As the shot lever 78 rocks, the arm 82 bears against the limit switch 99** to cause an interlock signal to be produced, which prevents the operating unit, not shown, from emitting the laser beam.

During the time when the stop pin 34 is disengaged from the notches 33, the arcuate cam **61*a* fits in the arcuate recess 62*b* formed in the intermediate gear 62, and the gear 60 no longer meshes with the intermediate gear 62. Hence, the rotation of the cam shaft 48 is not transmitted to the counter mechanism 22. After the stop pin 34 is completely disengaged from the notches 33, the gear 60 moves into a meshing engagement with the intermediate gear 62, causing it to rotate. The rotation of the cam shaft 48 during the time the gear 60 is brought into meshing engagement with the intermediate gear 62 is effective to cause the intermediate gear 62 to rotate through ¼ revolution, which in turn causes the counter pinion 70 to rotate the counter gear 28 through 1/10 revolution. Consequently, the rotatable disc 14 rotates through 1/10 revolution, changing the least significant digit in the six digit figure appearing within the conduit 2** by one.

At the same time as the gear 60 is released from the intermediate gear 62, the arcuate cam **61*a* again fits in the arcuate recess 62*b* formed in the intermediate gear 62. As a consequence, the rotation of the cam shaft 48 is not transmitted to the intermediate gear 62, and hence the stationary discs 9 to 14 remain stationary. As the cam shaft 48 rotates to cause a rotation of the cams 77, 79, the resilience of the springs 41, 81 return the cam lever 75 and the shot lever 78 to their original position, whereby the stop pin 34 again engages with the notches 33. The arm 82 is disengaged from the limit switch 99, thus enabling the emission of the laser beam. On the other hand, as the stop pin 34 rocks or prior to such moment, the solenoid 56 is deenergized to cause the pin 57 to move upward, lowering the engaging piece 54*b* of the stop 54. As a result, the engaging piece 54*b* engages the groove cam 53 in the clutch plate 49, causing the latter to be driven to the left against the resilience of the spring 52 so as to be disengaged from the clutch plate 47 to terminate the rotation of the cam shaft 48**.

The rotation of the counter gear 28 through 1/10 revolution causes the index wheel 88 to rotate through 1/10 revolution, whereby an operator is able to recognize that the least significant digit has been changed by one.

At a given time interval after the limit switch 99 is turned off, the operating unit, not shown, operates to initiate the emission of the laser beam into the conduit 2, whereby the laser beam marks the printing pattern defined within the conduit 2 on the label 8 applied to the container 7. Subsequently, the operating unit issues a pattern modification command, that is, a rotation command signal for the rotatable discs, thus repeating the above operation in a similar manner.

It should be noted that the number of teeth on the various gears contained in the counter mechanism 22 and those used in the drive system may be chosen arbitrarily provided the propagation of a carry is properly controlled.

It should also be understood that the counter mechanism 22 may be manually operated. Alternatively, the counter mechanism 22 may be omitted, and the rotatable discs 9 to 14 may be manually driven.

While the invention has been described in detail with reference to a particular embodiment thereof, it should be understood that various changes, modifications and variations can be made therein without departing from the scope and spirit of the invention. Hence, it is intended that all these changes, modifications and variations be covered by the appended claims.

What is claimed is:

1. A pattern controlling device for a laser marker in which a laser beam is profiled to a given printing pattern which is marked on the surface of an object; the pattern controlling device comprising a plurality of discs which are rotatably mounted in coaxial relationship and each formed with given patterns which permit the transmission of the laser beam therethrough, each of the rotatable discs being partly disposed in a path of passage of the laser beam so that the patterns on the individual rotatable discs are combined to define the printing pattern, in which the patterns which permit the passage of the laser beam therethrough are formed in patterned discs which are applied to a plurality of circular slots disposed in each rotatable disc in a concentric circle and centered about the axis of rotation of the rotatable discs and at an equal interval.

2. A pattern controlling device for a laser marker in which a laser beam is profiled to a given printing pattern which is marked on the surface of an object; the pattern controlling device comprising a plurality of rotatable discs disposed in coaxial relationship, a counter mechanism which causes each of the rotatable discs to rotate through a given angular increment whenever another adjacent rotatable disc located on one side thereof has rotated through one revolution, and a plurality of index wheels carrying given indicia or numerals and adapted to be moved together with the respective rotatable discs, each of the rotatable discs being formed with given patterns which permit the passage of the laser beam therethrough, the individual rotatable discs being partly disposed in a path of passage of the laser beam so that the patterns of the individual rotatable discs are combined to define the printing pattern.

3. A pattern controlling device according to claim 2 in which each of the rotatable discs fixedly carries a hollow cylinder on one side thereof which is centrally disposed thereon, the individual cylinders associated with the respective rotatable discs being rotatably telescoped over each other, each of the cylinders having an axial length which increases with a decreasing diameter of the cylinder, each cylinder including a portion which projects beyond the remaining cylinders and on which a counter gear forming part of said counter mechanism is fixedly mounted.

4. A pattern controlling device according to claim 3 in which each index wheel is driven by a gear located between the wheel and the associated counter gear.

5. A pattern controlling device for a laser marker in which a laser beam is profiled to a given printing pattern which is marked onto the surface of an object; the pattern controlling device comprising a plurality of rotatable discs disposed in coaxial relationship, a counter mechanism for rotating each rotatable disc through a given angular increment whenever another adjacent rotatable disc located on one side thereof has rotated through one revolution, a drive mechanism for driving the counter mechanism, and a plurality of index wheels carrying given indicia or numerals and each adapted to be driven as a corresponding one of the rotatable disc rotates, the respective rotatable discs being formed with given patterns which permit the passage of the laser beam therethrough, the respective rotatable discs being partly disposed in a path of passage of the laser beam so that the patterns on the individual rotatable discs are combined to define the printing pattern.

6. A pattern controlling device according to claim 5 in which the drive mechanism comprises an intermediate gear of an increased diameter which is ganged with the counter mechanism, a cam shaft for transmitting a rotation to the intermediate gear, a clutch shaft which is coupled to transmit the rotation to the cam shaft through a clutch mechanism, a stop for actuating and deactuating the clutch mechanism, and a drive motor for driving the clutch shaft for rotation.

7. A pattern controlling device according to claim 6 in which the cam shaft is provided with another gear with a hiatus and having teeth capable of meshing engagement with the intermediate gear, a cam having an arcuate cam profile in a region corresponding to the hiatus being fixedly mounted on the cam shaft, the intermediate gear being formed with an arcuate recess capable of receiving the arcuate cam profile.

8. A pattern controlling device according to claim 7 in which the clutch mechanism comprises a pair of clutch plates which are mounted on the cam shaft and the clutch shaft, respectively, the clutch plate mounted on the cam shaft being slidable along the cam shaft and being resiliently urged toward the other clutch plate, the first mentioned clutch plate being peripherally formed with a groove cam having a varying width.

9. A pattern controlling device according to claim 8, further including a stop disposed above a portion of the groove cam having an increased width, the stop being engageable and disengageable with the groove cam in response to a vertical oscillating motion thereof.

10. A pattern controlling device according to claim 9 in which the vertical oscillating motion of the stop is caused by a solenoid.

11. A pattern controlling device for a laser marker in which a laser beam is profiled to a given printing pattern which is marked on the surface of an object; the pattern controlling device comprising a plurality of rotatable discs disposed in coaxial relationship, a counter mechanism for rotating each rotatable disc through a given angular increment whenever another adjacent rotatable disc located on one side thereof has rotated through one revolution, a drive mechanism for driving the counter mechanism, a plurality of index wheels each associated with one of the rotatable discs and carrying given indicia or numerals, the wheels being driven as the associated rotatable disc rotates, each of the rotatable discs being peripherally formed with a plurality of notches which are engageable with a stop pin, the respective rotatable discs being formed with patterns which permit the passage of the laser beam therethrough, the respective rotatable discs being partly disposed in a path of passage of the laser beam so that the patterns on the individual rotatable discs are combined to define the printing pattern.

12. A pattern controlling device according to claim 11 in which the stop pin is rockably mounted on a stop shaft which is journaled in a stationary part of the device, the stop pin being resiliently urged toward the rotatable discs, the stop shaft fixedly carrying a cam lever which normally bears against a cam in the drive mechanism.

* * * * *